US009329759B1

(12) United States Patent
Hill

(10) Patent No.: US 9,329,759 B1
(45) Date of Patent: May 3, 2016

(54) CUSTOMIZED CONTENT DISPLAY AND INTERACTION

(71) Applicant: Amazon Technologies, Inc., Reno, NV (US)

(72) Inventor: Peter F. Hill, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 193 days.

(21) Appl. No.: 13/682,490

(22) Filed: Nov. 20, 2012

(51) Int. Cl.
*G06F 3/00* (2006.01)
*G06F 3/0484* (2013.01)
*G06F 3/048* (2013.01)
*G06F 3/0481* (2013.01)

(52) U.S. Cl.
CPC ........ *G06F 3/04842* (2013.01); *G06F 3/04845* (2013.01); *G06F 3/048* (2013.01); *G06F 3/0484* (2013.01); *G06F 3/04812* (2013.01)

(58) Field of Classification Search
CPC ... G06F 3/048; G06F 3/04812; G06F 3/0484; G06F 3/04845

USPC .......................................................... 715/810
See application file for complete search history.

(56) References Cited

U.S. PATENT DOCUMENTS

| | | | |
|---|---|---|---|
| 2003/0052901 A1* | 3/2003 | Fukuchi ........................ | 345/660 |
| 2004/0001087 A1* | 1/2004 | Warmus et al. ............... | 345/745 |
| 2004/0080541 A1* | 4/2004 | Saiga et al. ................... | 345/805 |
| 2006/0242595 A1* | 10/2006 | Kizumi ......................... | 715/786 |
| 2007/0106672 A1* | 5/2007 | Sighart et al. ................. | 707/10 |
| 2007/0124672 A1* | 5/2007 | Cragun et al. ................ | 715/531 |
| 2010/0053213 A1* | 3/2010 | Ishida et al. .................. | 345/629 |
| 2010/0251166 A1* | 9/2010 | Matsui .......................... | 715/784 |
| 2012/0005623 A1* | 1/2012 | Ishak et al. ................... | 715/786 |
| 2012/0005628 A1* | 1/2012 | Isozu et al. ................... | 715/838 |
| 2013/0036386 A1* | 2/2013 | Park et al. .................... | 715/831 |

* cited by examiner

*Primary Examiner* — Kieu Vu
*Assistant Examiner* — Andrew Chung
(74) *Attorney, Agent, or Firm* — Sutherland Asbill & Brennan LLP

(57) ABSTRACT

Systems and methods for providing customized content display and interaction to a user on a user device display are disclosed. The customized display and interaction may be based at least in part on user related information and information related to the displayed content.

24 Claims, 10 Drawing Sheets

CUSTOMIZED CONTENT DISPLAY AND INTERACTION

BACKGROUND

With increasing penetration of personal electronic devices in many aspects of life, such as communications, shopping, and entertainment, there has been a focus on a user's interaction with his/her electronic devices. In recent years, a variety of input/output (I/O) components and/or interfaces, such as touch sensitive display screens, have been provided on electronic devices. User interactions with touch sensitive display screens may involve a user touching the surface of the touch sensitive display screen with one or more pointing elements, such as the user's finger.

BRIEF DESCRIPTION OF THE DRAWINGS

The detailed description is set forth with reference to the accompanying figures. The use of the same reference numbers in different figures indicates similar or identical items; however, various embodiments may utilize elements and/or components other than those illustrated in the figures.

DETAILED DESCRIPTION

Overview

Figure 1:
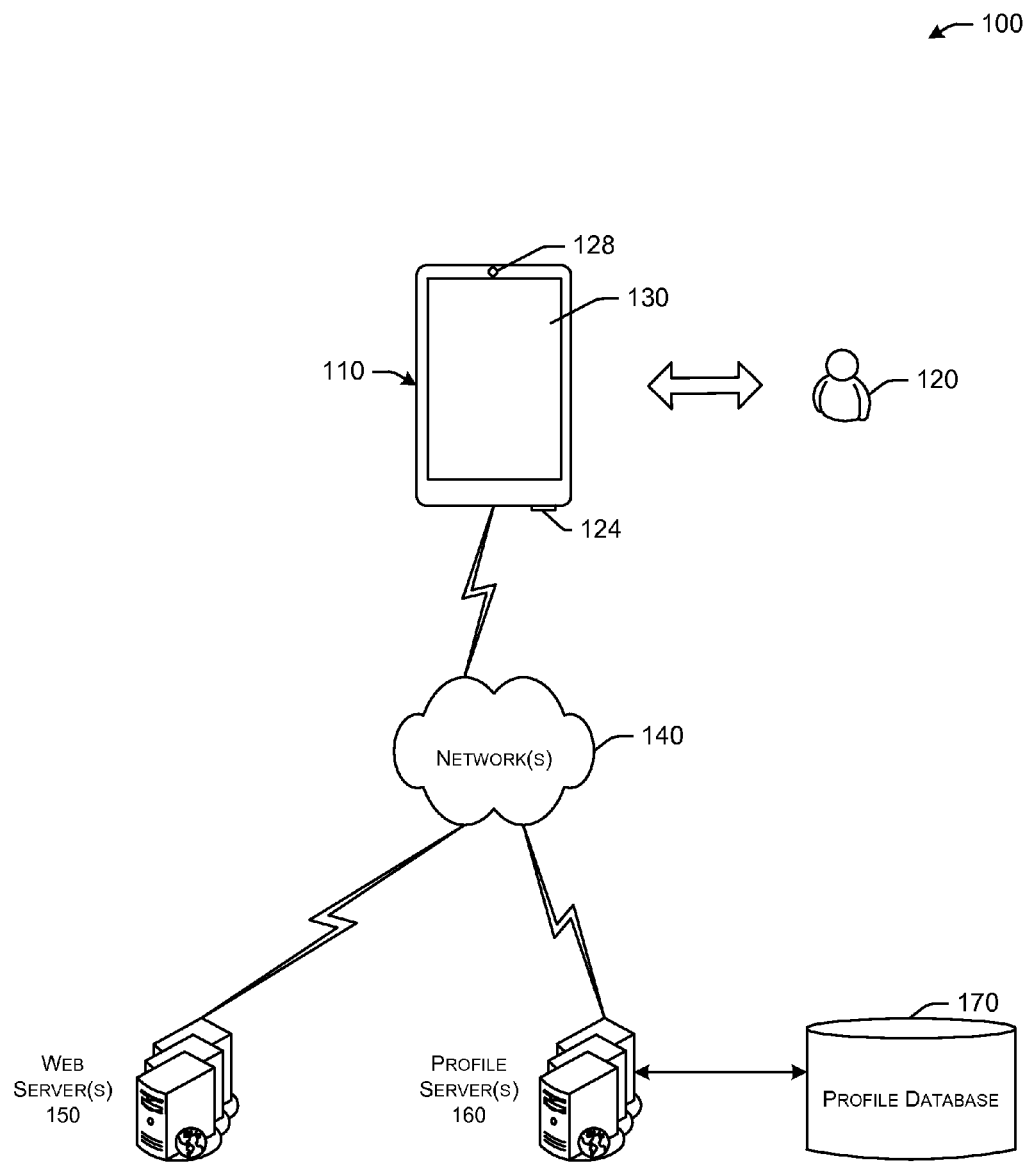
FIG. 1 is a schematic diagram that illustrates an example architecture for providing user specific interaction experience with an example user device, in accordance with embodiments of the disclosure.

Embodiments of the present disclosure may include systems and methods for providing customized rendering of content, such as web pages, on a display screen of a user device. The embodiments of the disclosure may further include systems and methods for customized user interaction with content rendered on a user device. Customized rendering and customized user interaction of content may be based at least in part on a user profile that includes information about a user's interaction with content on the user device and/or other user related information.

In certain embodiments, the user device may include hardware and/or software to monitor and/or learn user behavior associated with interacting with content rendered on the user device. In one aspect, the user device may monitor user interaction on an input/output (I/O) device on which content is rendered. For example, a user's interaction with particular content displayed on a touch sensitive display screen may be monitored. Based at least in part on the user interactions monitored, the user device and processors, and/or software associated therewith, may generate one or more display parameters. The set of the one or more display parameters may be provided as a user profile. The display parameters may be related to any variety of interactions, such as scroll speeds of content for various types of content, area of the user's touch on the touch sensitive display screen, or particular user interaction regions that may be touched and/or selected on the touch sensitive display screen.

In embodiments where multiple users use a particular user device, each user or groups of users may have a user profile associated therewith. In other embodiments, all of the users of the user device may share a common user profile. In further embodiments, the user device may be configured to communicate with one or more profile servers and/or profile databases. The user device may save one or more user profiles associated with users of the user device on the profile server and/or the profile database. The user device may further be configured to receive and/or utilize one or more user profiles from the profile server and/or profile database. In these embodiments, multiple user devices may be able to access, use and/or modify the same user profile from the profile server and/or profile database. For example, a particular user may access content on multiple user devices and may want the same look and feel on all of his/her devices and may implement the same by utilizing a single user interaction profile that is stored on the cloud. In certain embodiments, variations of user profiles may be generated and provided for a particular user based at least in part on the type of user device the user utilizes to display a particular content.

In certain embodiments, the content may be displayed on a touch sensitive display screen of the user device. The user device may be configured to receive user interaction via the touch sensitive display screen. The content may be one or more web pages displayed on the touch sensitive display screen by executing one or more application software on one or more processors of the user device, such as a web viewer application software. In these embodiments, the processors of the user device may be configured to observe a variety of user interaction characteristics. For example, the processors of the user device may determine the touch area of the user's touch on the touch sensitive display screen when the user interacts with the content on the user device. The touch area or an indication thereof may be a display parameter. The user may further pinch the surface of the touch sensitive display screen to resize the content on the touch sensitive display screen. The size of the pinch, or otherwise the spacing of the user's fingers on the surface of the touch sensitive display screen may be determined by the user device and the processors thereon and the indication of the size of the pinch may be identified as another display parameter. The user may further scroll through portions of the media content at various speeds. For example, the user may reach the end of the content and then may attempt to quickly scroll back to the top of the content. This fast reverse scroll preference may be recorded as yet another display parameter. The user device may still further determine that certain portions of content may be regions where the user may scroll relatively quickly and/or relatively slowly. The user may identify these differential scroll rates as still another display parameter.

In further embodiments, the user device may be configured to receive a content profile associated with content displayed on the touch sensitive display screen of the user device. In one aspect, the content profile may be received as metadata from the source of the content, such as a web server. Alternatively, the content profile may be determined by the user device by analyzing the content. For example, the user device and the processors thereon may perform natural language analysis on the content. In this case, the user device may determine words that are in particular portions of the content. In certain embodiments, the user device may identify a content profile based at least in part on both metadata associated with the content and by performing analysis on the content.

The user device may be configured to ascertain one or more display parameters based at least in part on both user interactions with the content displayed on the touch sensitive display screen and the content profile associated with the displayed content. In one aspect, the user device and the processors thereon may ascertain, based at least in part on the content profile, subject matter associated with various portions of the content. The user device may further determine, based at least in part on the subject matter associated with various portions of the content and the user's interaction at those various portions of the content, the user's interest in particular subject matter associated with the content. For example, consider an example content that may have a variety of subject matter. If the user scrolls through a particular portion associated with a particular subject matter relatively slower than other portions, then the user device may determine that the user is interested in the subject matter associated with the portion where the user scrolled relatively slowly. The user device may identify a display parameter based at least in part on the assessed user interest.

The user device may be configured to further receive user information, such as the user's web content viewing history, demographic information, and/or product or service purchase history. Based on this received user information, the user device may determine and or modify one or more display parameters associated with the user for whom user information is received by the user device. The user device may further group the collection of user parameters as the user profile. In other words, the user device may be able to generate and/or modify a user profile associated with the user. This user profile may be utilized by the user device to customize the user's content interaction experience.

Embodiments of the disclosure may provide the user device to utilize the user profile and associated display parameters to provide a variety of user interaction customization. The user device may display content and determine subject matter associated with various locations of the content. The display of the content on the touch sensitive display screen of the user device may be modified based at least in part on the subject matter of the various locations of the content, as well as the user's user profile and associated display parameters. For example, locations of the content associated with subject matter of likely interest to the user may be displayed relatively more prominently on the touch sensitive display screen. In some cases, the locations that are displayed relatively more prominently may be user interaction locations, such as locations that may be touched by the user on the touch sensitive display screen corresponding to locations on the content that may be touched to effect an action by the user device. For example, a user interaction location may be a hyperlink that may be touched by the user to display another portion, at least in part, of the displayed content or a different content. In this case, the display of content on the touch sensitive display screen of the user device may be based at least in part on both the user profile associated with the user and the content profile associated with the content that is displayed on the touch sensitive display screen of the user device.

In certain embodiments of the disclosure, user interaction areas of the content, or locations of the content that may be touched on the touch sensitive display screen of the user device, may have an area that is based at least in part on display parameters of the user's profile that indicates the area of the user's touch. In some cases, if the area of a user's touch is relatively large on the touch sensitive display screen, the user interaction locations on the content may be displayed with a relatively larger area. In other cases, if the user's touch on the touch sensitive display screen is relatively small, the indication of a small area may be provided by the user's profile in one or more associated display parameters. In this case, user interaction locations on the displayed content may be displayed with a relatively smaller area.

In certain further embodiments of the disclosure, user content displayed on the touch sensitive display screen of the user device may have different levels of scroll friction based at least in part on the content profile of the displayed content and the user profile. In other words, the speed at which certain portions of content displayed on the user device may vary based on the subject matter of various portions of the content and the user's level of interest with various subject matter. For example, the scroll friction may be set higher in portions of the content where the user may have a relatively high level of interest and may be set lower in portions of the content where the user may have a relatively lower interest. In effect, this may mean that the user may be able to scroll through subject matter in the content that may be of relatively high interest to him/her at a slower scroll speed. Likewise, the user may be able to scroll through subject matter in which he/she may have a relatively lower level of interest at a relatively greater scroll speed.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative environment 100 in which techniques for providing customized user interaction on a user device 110 may be implemented. The user device 110 may be configured to interact with a user 120. The user device 110 may further be configured to interact with other elements or other devices via one or more communicative links, such as connection to network 140. In one aspect, the user device 110 may be configured to download and/or upload media files and/or other media data via the network 140. The user device 110 may include one or more user input/output (I/O) interfaces, such as a touch sensitive display screen 130, microphone 124, and camera 128. While these specific I/O interfaces are shown, there may be any number and/or variety of I/O devices and/or sensors disposed on the user device 110, such as additional image sensors, microphones, accelerometers, speakers, haptic devices, or the like.

The users 120 may be individuals or other entities, such as corporations, non-profit organizations, for-profit organizations, government organizations, public sector organizations, or any of the aforementioned entities located in this or foreign countries. The user device 110 may be any one of suitable devices that may be configured to user interaction 120 and display one or more media elements. The user device 110, in certain embodiments, may be a personal user device. For example, the user device 110 may include, but is not limited to, a personal computer, a desktop computer, a notebook computer, a laptop computer, a personal digital assistant, an electronic book (ebook) reader, a tablet computing device, a pad computing device, a smart phone, or combinations thereof. While the drawings and/or specification may portray the electronic device in the likeness of an ebook reader and/or tablet computing device, the disclosure is not limited to such. Indeed, the systems and methods described herein may apply to any electronic device capable of displaying media elements, such as text, images, and/or sound.

Microphones 124 may be of any known type including, but not limited to, condenser microphones, dynamic microphones, capacitance diaphragm microphones, piezoelectric microphones, optical pickup microphones, or combinations thereof. Furthermore, the microphones may be of any directionality and sensitivity. For example, the microphones may be omni-directional, uni-directional, cardioid, or bi-directional. Image sensors 128 may be any known device that converts an optical image to an electronic signal. The image sensor 128 may be of any known variety including a charge coupled device (CCD), complementary metal oxide semiconductor (CMOS) sensors, or the like. The image sensor 128 may further be of any pixel count and aspect ratio. The user device 110 may be configured to receive input signals from each of the microphones 124 and image sensor 128. In certain embodiments, the user device 110 may be configured to identify user 120 interaction characteristics based at least in part on input from the microphone 124 and image sensor 128. For example, the user device 110 may be configured to ascertain voice commands from the user 120 by utilizing the microphone 124 or ascertain user 120 gestures by utilizing the image sensor 128.

The touch sensitive display screen 130 may be any suitable touch sensitive display, including, but not limited to a capacitive panel. The capacitive panel may have a plurality of capacitive cells (not shown) of any shape and size that may have a varying charge associated therewith. The charge on each cell may vary based on proximity of a pointing device, such as a finger near one or more of the cells and the variation in charge may be interpreted by the user device 110 as an indication of touching the touch sensitive display screen 130. In other words, a conductive element, such as the finger, may be able to perturb the charge on one or more capacitive cells of the capacitive panel when proximate to those cells. Therefore, the capacitive panel signal can indicate the region on the touch sensitive display screen 130 where an object, such as the finger, is near or touching. The functioning of capacitive panels is well known, and in the interest of brevity, will not be reviewed here.

The networks 140 may include any one or a combination of different types of suitable communications networks, such as cable networks, the Internet, wireless networks, cellular networks, and other private and/or public networks. Furthermore the networks 140 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. It is also noted that the described techniques may apply in other client/server arrangements (e.g., set-top boxes, etc.), as well as in non-client/server arrangements (e.g., locally stored software applications, etc.).

The environment may also include one or more web servers 150 and one or more profile servers 160 which may be communicatively coupled to an associated profile database 170. The web servers 150 may be configured to provide one or more websites, webpages, documents, or other content to the user device 110 that may be rendered on I/O devices 124, 128, 130 of the user device 110 to the user 120. The websites and/or web services offered by the web servers 150 may include any variety of suitable websites and/or web services, such as social networking web sites, websites of vendors of products or services, news and/or information websites, or the like. In one aspect, the websites may be requested by the user device 110 via the networks 140 and delivered by the web servers 150 via the network 140 to the user device 110 responsive to the request received from the user device 110. It will further be appreciated that in certain embodiments, the web servers 150 may provide unique access and/or unique content to each of the users 120 that access websites and/or web services served by the web servers 150. To render the unique access and/or unique content to each user 120 of the web pages and/or web services provided by the web servers 150, the web servers 150 may require authentication credentials, such as a login and a password, from a user 120 to uniquely identify the user and access the requested website.

In certain embodiments, content received by the user device 110 from the web servers 150 may be displayed on the touch sensitive display screen 130. In certain further embodiments, the user device 110 may be configured to customize the display of the content received from the web server 150 based on information related to the user 120, such as a user profile, and/or information related to the received content, such as a content profile. In some cases, information and/or metadata associated with content may be received by the user device 110 along with the content from the web servers 150. In these cases, the information associated with the content may include information related to subject matter associated with various locations of the content provided by the web servers 150. In these or other cases, the information associated with the content may include keywords associated with locations of the content. In other cases, areas where the user 120 may interact, such as by touching on the touch sensitive display screen 130 may be indicated and, in some cases, subject matter associated with one or more of those interaction locations may be indicated.

The requests for content from the user device 110 from the web servers 150 may be based on user interaction, such as a user 120 providing a World Wide Web (WWW) address from which to retrieve content. The request may be generated by the user device 110 and one or more processors thereon and may be in the form of one or more data packets that may be transmitted via the networks 140. The content from the web server 150 may be received in the form of one or more data packets via the networks 140. The content may be received by the user device 110 in a streaming fashion or may be received in whole prior to rendering on the touch sensitive display screen 130. While the illustrated example represents the users 120 accessing a website and/or web service over the networks 140, the described techniques may equally apply in instances where the users 120 interact with the website servers 110 via the one or more user devices 110 over a landline phone, via a kiosk, or in any other manner.

The profile server 160 may include one or more processors and/or memories and may be communicated with by the user device 110 to receive and/or transmit one or more user profiles associated with one or more users 120. The user profiles may be stored and/or accessed by the profile server 160 on the profile database 170 that is communicatively coupled to the profile server 160. In one aspect, the profile server 160 may be configured to allow access of a particular user profile from more than one user device 110. In some cases, the profile server 160 may be configured to verify that the multiple user devices 110 from which a particular user profile is accessed is associated with a single particular user 120. In other words, a user 120 may be able to access a user profile from multiple user devices 110 that he/she uses to view and/or interact with content. In certain embodiments, the user profile may be requested by the user device 110 from the profile server 160. This request process, in some cases, may involve authenticating the user 120 and/or user device 110 that provides the request for the user profile. The user profile may be provided by the profile server 160 responsive to a profile request to the user device 110 and may be transmitted via the networks 140 in the form of one or more data packets.

Figure 2:
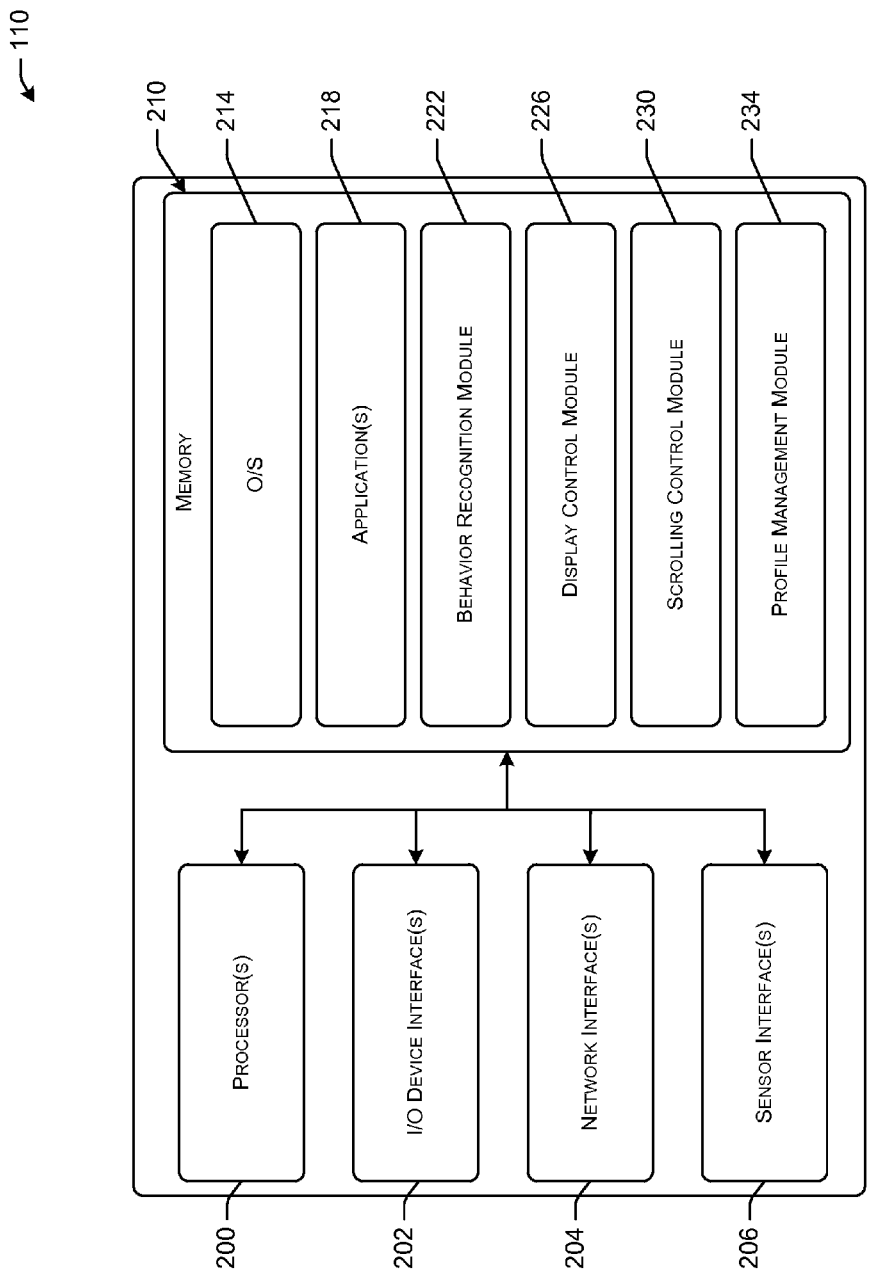
FIG. 2 is a block diagram that illustrates example functional and/or physical components of the example user device of FIG. 1, in accordance with embodiments of the disclosure.

Referring now to FIG. 2, the user device 110 may include one or more processors 200, one or more I/O device interfaces 202, one or more network interface(s) 204, one or more sensor interface(s) 206, and/or one or more memories 210. In some examples, the processors 200 of the user device 110 may be implemented as appropriate in hardware, software, firmware, or combinations thereof. Software or firmware implementations of the processors 200 may include computer-executable or machine-executable instructions written in any suitable programming language to perform the various functions described. Hardware implementations of the processors 200 may be configured to execute computer-executable or machine-executable instructions to perform the various functions described. The one or more processors 200 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 110 may also include a chipset (not shown) for controlling communications between the one or more processors 200 and one or more of the other components of the user device 110. The one or more processors 200 may also include one or more application specific integrated circuits (ASICs) or application specific standard products (ASSPs) for handling specific data processing functions or tasks.

The input/output (I/O) device(s) or user interface(s), such as the touch sensitive display screen 130, may be controlled via the one or more I/O device interfaces 202. The network interfaces(s) 204 may allow the user device 110 to communicate via network 140 and/or via other communicative channels. For example, the user device 110 may be configured to communicate with stored databases, other computing devices or servers, user terminals, other devices on the networks 140 and/or repositories of media content. The sensor interface(s) 206 may enable the user device 110 to receive and interpret signals form the one or more sensors, such as other I/O devices like accelerometers.

The memory 210 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 210 may store program instructions that are loadable and executable on the processor(s) 200, as well as data generated or received during the execution of these programs. Turning to the contents of the memory 210 in more detail, the memory 210 may include one or more operating systems (O/S) 214, an applications module 218, a behavior recognition module 222, a display control module 226, a scrolling control module 230, and/or a profile management module 234. Each of the modules and/or software may provide functionality for the user device 110, when executed by the processors 200. The modules and/or the software may or may not correspond to physical locations and/or addresses in memory 210. In other words, the contents of each of the modules 214, 218, 222, 226, 230, 234 may not be segregated from each other and may, in fact be stored in at least partially interleaved positions on the memory 210.

The operating system module 214 may have one or more operating systems stored thereon. The processors 200 may be configured to access and execute one or more operating systems stored in the operating system module 214 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like. The application module 218 may contain instructions and/or applications thereon that may be executed by the processors 200 to provide one or more services to the user. These instructions and/or applications may, in certain aspects, interact with the operating system module 214 and/or other modules of the user device 110.

The behavior recognition module 222 may have stored thereon instructions and/or programs that when executed by the processors 200, may enable the user device 110 to identify and analyze various aspects of a user's behavior and/or interaction with a particular content displayed on the touch sensitive display screen 130. In one aspect, the behavior recognition module 222 and the instruction stored thereon may enable the processors 200 to identify the area of a user's touch on the touch sensitive display screen 130. The user device 110 and the processors 200 thereon may be able to identify if the area of a user's touch is relatively large or relatively small. Some users may have fat fingers and others may have skinny fingers and the way that a user 120 interacts with the touch sensitive display screen 130 may vary based on the size of the user's finger. Furthermore, some users may choose to press hard on the touch sensitive display screen 130 and thereby have a relatively large interaction area and other users may touch the touch sensitive display screen 130 gently and thereby have a relatively small interaction area. Therefore, based on observation of these and other factors, the user devices 110 and the processors 200, by executing the instructions stored in the behavior recognition module 222, may generate and/or select one or more display parameters associated with the area of a user's interaction with the touch sensitive display screen 130. This display parameter may be part of a user profile and may be subsequently used by the user device 110 for customizing the display of user content on the touch sensitive display screen 130 for the user 120.

The instructions in the behavior recognition module 222, when executed by the processors 200 may further enable the user device 110 to determine the level of accuracy with which the user 120 touches certain locations on the touch sensitive screen 130. For example, the user device 110 may ascertain if the user touches the middle of an interaction location or near the edges of an interaction location. The processors 200 may further ascertain if the interaction position within an interaction location depends on the relative location of the interaction location on the touch sensitive display screen 130. For example, the accuracy and the interaction area with which a user 120 touches an interaction location may be different at the center of the touch sensitive display screen 130 than at the edges of the touch sensitive display screen 130. The particular characteristics of precision, accuracy, and/or area of a user's interaction with interaction locations of the content may be analyzed by the processors 200 and may further be codified by the processors 200 as one or more display parameters that may be part of the user profile associated with the user 120.

The processors 200 of the user device 110, when executing the instructions stored in the behavior recognition module 222 may further be configured to ascertain the size and/or location of a user's pinch and the level of size change that a user 120 may desire from a particular pinch size. In other words, a user's pinch on the touch sensitive display screen 130 may indicate the user's intention to resize the content displayed on the touch sensitive display screen 130 and the processors 200 may be able to ascertain certain characteristics from the user's pinch. For example, a user's pinch size may be indicative of the user's intended final scaling of the displayed content. As another example, the user's finger interaction area size on the touch sensitive display screen 130, which may be related to the force with which the user touches the touch sensitive display screen 130, may be indicative of the level of scaling that the user desires 130. In yet another example, the speed at which the user 120 pinches or expands his/her fingers on the touch sensitive display screen 130 may be indicative of the speed at which he/she may want to scale the displayed content on the touch sensitive display screen 130.

Instructions and/or applications stored in the behavior recognition module 222 may further be executed by the processors 200 and thereby enable the processors 200 to ascertain user 120 behavior based at least in part on one or more content profiles that provide information associated with displayed content, such as subject matter at particular locations of the content. In certain embodiments, the processors 200, by executing instructions stored in the behavior recognition module 222, may be configured to determine the user's subject matter interests by monitoring the speed at which the user 130 scrolls through portions of the displayed content. Furthermore, the processors 200 may be configured to observe if the user scrolls back into a particular content associated with a particular subject matter within the displayed content. For example, if the user 120 scrolls relatively slowly through a first location of the content area associated with a first subject matter and relatively fast through a second location of the content area associated with a second subject matter, the processors 200 may predict that the user 120 has a relatively higher interest in the second subject matter. The processors 200 may further determine one or more display parameters associated with observations of the scroll speeds of the user 120 through the content that is displayed on the touch sensitive display screen 130. In certain embodiments, display parameters may be generated that are indicative of a user's interests and preferred subjects. These display parameters may be part of the user profile associated with the observed user 120. These display parameters may further be used by the user device 110 to set a variety of display and interaction characteristics for the user 120, such as the scroll friction.

The display control module 226 may have stored thereon instructions and/or programs that when executed by the processors 200, may enable the user device 110 to customize content, such as web pages that may be displayed on the touch sensitive display screen 130. The displayed content may have certain portions that may be displayed more prominently than other portions based at least in part on attributes of the various locations of the content and subject matter interest of the user 120. In certain embodiments, the processors may display an interaction location, such as a hyperlinked area on the content, with a larger size relative to other interaction locations if the interaction location corresponds with a subject matter that may be of relatively high interest to the user 120 to whom the content is displayed on the touch sensitive display screen 130. In other cases, areas of the content that may be of interest to the user 120 to whom the content may be displayed, may be highlights, brightened, bolded, resized or the like. In some cases, the content may be received by the user device 110 in Extensible Markup Language (XML) format or hyper-text markup language (HTML), for display on the touch sensitive display screen 130. In certain embodiments, the XML formatting may be overridden by the processors 200 based at least in part on one or more display parameters associated with a particular user profile. In these and other embodiments, the prescribed and/or coded formatting may further be overridden by the processors based at least in part on a content profile associated with the displayed content. The content profile in this case may indicate the subject matter associated with various parts of the displayed content.

The scrolling control module 230 may have stored thereon instructions and/or programs that when executed by the processors 200, may enable the user device 110 to customize scrolling interaction, such as with web pages that may be displayed on the touch sensitive display screen 130. In certain embodiments, the scroll friction, or otherwise the speed of scroll relative to finger swipes, may be variably controlled throughout a particular displayed content. In these and other embodiments, the processors 200 may be configured to provide greater friction, or otherwise a slower scroll rate, in locations of the content that correspond to subject matter that may be of relatively higher interest to the user 120. Similarly, the processors 200 may be configured to provide reduced friction, or otherwise a faster scroll rate, in locations of the content that correspond to subject matter that may be of relatively lower interest to the user 120. The subject matter in various locations of the content may be ascertained by the processors 200 based at least in part on a content profile associated with the content. Furthermore, the user's interests may be ascertained by the processors 200 based at least in part on the user profile associated with the user 120. In certain further embodiments, the processors 200 may be configured to enable a relatively fast upward or reverse scroll once the user 120 has scrolled to the bottom of a displayed content if it has been determined from the user profile that the user 120 prefers to quickly scroll to the beginning of the content after having read the content.

The profile management module 234 may have stored thereon instructions and/or programs that when executed by the processors 200, may enable the user device 110 to generate, store, load, interpret, and/or generally manage various functions associated with a user profile. In one aspect the processors 200 may be configured to observe user behavior using instructions stored in the behavior recognition module 222 and generate one or more display parameters therefrom. These display parameters may be grouped together for a particular user as a user profile. Therefore, the user profile may have a variety of elements, or display parameters, that are indicative of user preferences and or customizations that may be preferred by the user 120. The instructions stored in the profile management module 234 may enable the processors to collect various display parameters determined based at least in part on observation of the user's behavior and/or interaction with one or more content displayed on the touch sensitive display screen 130 and based at least in part on the collected display parameters for the user 120, generate a user profile. The processors 200 may further be configured to update a particular user profile associated with a particular user 120 if one or more of the associated display parameters for that user 120 changes with further observation of the user's behavior.

The processors 200 may yet further be configured to save and/or store one or more user profiles locally on the user device 110, such as on the memory 210, or remotely, such as on the profile server 160 and/or the profile database 170. In one aspect, the processors 200 may be configured to transmit the user profile to the profile server 160 via the networks 140 or other suitable communicative links in any suitable transfer mechanism, such as in the form of one or more data packets. The processors 200 may further be configured to receive and/or retrieve one or more user profiles from the profile server 160 via the networks 140 or other suitable communicative links. In certain embodiments, the processors 200 may request the appropriate user profile from the profile server 160 based at least in part on identification of the user 120. In cases where multiple users 120 may use a single user device 110, the user device 110 may ascertain the current user 120 of the user device 110 based at least in part on user input to the user device 110. For example, the user device 110 may solicit the name of the current user 120 or solicit a login and password of the current user 120. Indeed, the processors 200 may use a variety of mechanisms to ascertain the identification of the current user 120 of the user device 110.

In certain embodiments of the disclosure, the processors 200, by executing instructions stored in the profile management module 234, may be able to identify the user 120 of the user device 110, and thereby identify the appropriate user profile, by observing the user's interaction with content on the user device 110. In other words, if the user device 110 has two or more users 120 and each of the users have one or more distinct user interaction features and/or markers, such as interaction area or scroll speeds, then the user device 110 and the processors 200 thereon may be configured to identify the distinct user interaction behavior to identify the user 120 among the users 120 that are typically using the user device 110. In these cases, the processors 200 may store one or more display parameters associated with users 120 of the user device 110 locally on the user device 110 for identifying users 120 prior to loading a full user profile containing a relatively more complete set of display parameters associated with a particular user 120.

In further embodiments, the processors 200 may further be configured to identify a content profile associated with a particular content to be displayed on the touch sensitive display screen 130 of the user device 110 by executing instructions that may be stored in the profile management module 234. The content profile may contain information associated with various elements of the content to be displayed on the user device 110. This information may include the type of elements, such as text, images, video and/or sound, which is in the various locations of the content. The content profile may further indicate the subject matter associated with various parts of the content. In certain embodiments, the content profile or information associated therewith may be received by the processors 200 from a variety of sources, such as the source of the content. In other embodiments, the processors 200 may generate a content profile associated with a received content based on a variety of methods, such as natural language recognition and/or optical character recognition (OCR). Therefore, the processors 200, by identifying one or more key words in various locations of the content, may be configured to estimate the subject matter associated with the various locations of the content.

It will be appreciated that there may be overlap in the functionality of the instructions stored in the behavior recognition module 222, the display control module 226, the scrolling control module 230, and/or the profile management module 234. In fact, the functions of the aforementioned modules 222, 226, 230, 234 may interact and cooperate seamlessly under the framework of the user device 110. Indeed, each of the functions described for any of the modules 222, 226, 230, 234 may be stored in any module 222, 226, 230, 234 in accordance with certain embodiments of the disclosure. Further, in certain embodiments, there may be one single module that includes the instructions, programs, and/or applications described within the behavior recognition module 222, the display control module 226, the scrolling control module 230, and/or the profile management module 234.

The memory 210, any databases, and/or any other memory modules, both removable and non-removable, are all examples of computer-readable storage media. For example, computer-readable storage media may include volatile and non-volatile, removable and non-removable media implemented in any method or technology for storage of information such as computer-readable instructions, data structures, program modules, and/or other data.

Illustrative Processes

Figure 3:
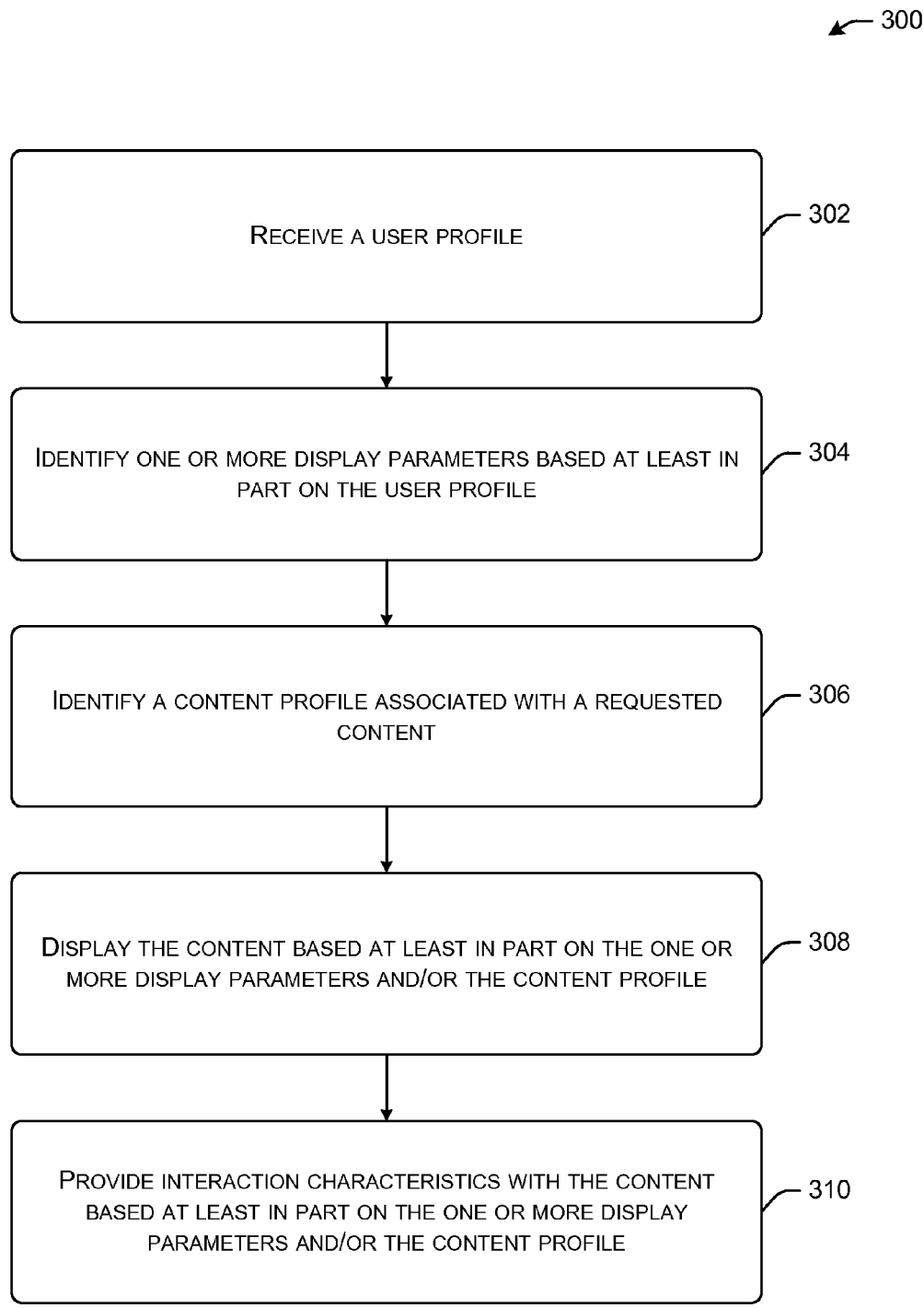
FIG. 3 is a flow diagram illustrating an example method for providing customized user interaction experience with the example user device of FIGS. 1 and 2, in accordance with embodiments of the disclosure.

Referring now to FIG. 3, an example method 300 for providing customized user interaction experience with the user device 110 is discussed. The method 300 may be performed by the user device 110 and the processors 200 thereon using instructions and/or programs stored in the memory 210 or received from a remote entity by the user device 110.

At block 302, a user profile may be received. The user profile may have a collection of display parameters associated therewith. These display parameters may identify various aspects of how the user 120 may prefer to view content on the touch sensitive display screen 130. The display parameters may further be indicative of how the user 120 prefers to interact with the content and the user device 110 displaying the content on the touch sensitive display screen 130. For example, the display parameters that constitute the user profile may include various indicators of what size of user interaction regions on the content may be convenient for the particular user 120, such as for the purposes of user interaction. In further examples, the display parameters may be indicative of the user's subject matter interests. In yet further examples, the display parameters may be indicative of the user's preferences in scroll speeds, such as scroll speeds controlled by finger swipes on the touch sensitive display screen 130. In certain embodiments, the user profile may be received and/or loaded from memory 210. Therefore, in these or other embodiments, the processors 200 may identify a particular user 120 of the user device 110 and fetch from memory 210 the user profile associated with the user 120. In certain other embodiments, the user profile for the user 120 may be stored remotely, such as at the profile server 160. In these embodiments, the processors 200 may identify which user profile to retrieve from the profile server 160 and transmit a user profile request to retrieve the user profile. The user profile request may be in the form of one or more data packets and may be transmitted by the user device 110 to the profile server 160 via the networks 140 or other suitable communicative links. The profile request may identify one or more of the user 120, the user profile, the user device 110, one or more display parameters associated with the user profile, or the like.

At block 304, one or more display parameters may be identified based at least in part on the user profile. As mentioned above, the user profile may include one or more display parameters that are indicative of various aspects of the user's preferences or display and/or interaction characteristics with displayed content on the touch sensitive display screen 130. All or a subset of display parameters associated with the user profile may be identified by the processors for use in method 300. In some cases, one or more display parameters of the user profile may be user device specific and, therefore, in that case, the user device 110 may ascertain which of the display parameters may be relevant to the user experience on the user device 110. For example, the user device 110 may be a laptop computer without a touch sensitive display and, therefore, may determine that the area of user interaction locations may not be a relevant display parameter, as it might be on a smart phone or ebook reader with a touch sensitive display screen.

At block 306, a content profile associated with a requested content may be identified. The content may be, for example, a web page that may be served by the web servers 150. Other examples of content may include books, text, movies, songs, or the like that may be rendered on the user device 110 and/or displayed on the touch sensitive display screen 130. The content profile may indicate the location of various elements of the content. For example, locations for user interaction on the content may be identified in the content profile. As another example, subject matter associated with various locations of the content may be identified. Consider an example content that provides information about a city. In this guide locations may be identified in the content profile as pertaining to food, entertainment, night life, hotels, travel, sights to see, or the like. The content profile may further identify locations within the content to be displayed, such as the beginning, middle, and/or the end of the content.

At block 308, the content may be displayed based at least in part on the one or more display parameters and/or the content profile. In one aspect, the content may have portions and/or locations highlighted and/or otherwise emphasized based at least in part on user interests as determined from the user profile and locations of particular subject matter within the content as determined by the content profile. Additionally, user interactions locations may be sized on the display to accommodate for such elements as the user's finger size, user's finger pressure on the touch sensitive display screen 130, the user's touch accuracy, and/or the user's touch precision. Therefore, the content may be displayed on the touch sensitive display screen 130 in a customized fashion.

At block 310, customized interaction characteristics associated with the content may be provided based at least in part on the one or more display parameters and/or the content profile. The customized interaction may include differential scroll friction at different parts of the content that is displayed on the touch sensitive display screen 130. In other words, certain locations of the content may scroll relatively quickly and others relatively slowly for the same type of swipe, such as the same speed, length, and/or frequency of swipe on the touch sensitive display screen 130. In certain embodiments, the scroll friction may depend on the subject matter associated with various locations on the content and the interest level of the user 120 for the various subject matter displayed in the content. In some cases, the processors may enable a relatively faster reverse scroll once the user 120 has scrolled to the bottom or close to the bottom of the content.

It should be noted that the method 300 may be modified in various ways in accordance with certain embodiments. For example, one or more operations of the method 300 may be eliminated or executed out of order in other embodiments. Additionally, other operations may be added to the method 300 in accordance with other embodiments.

Figure 4:
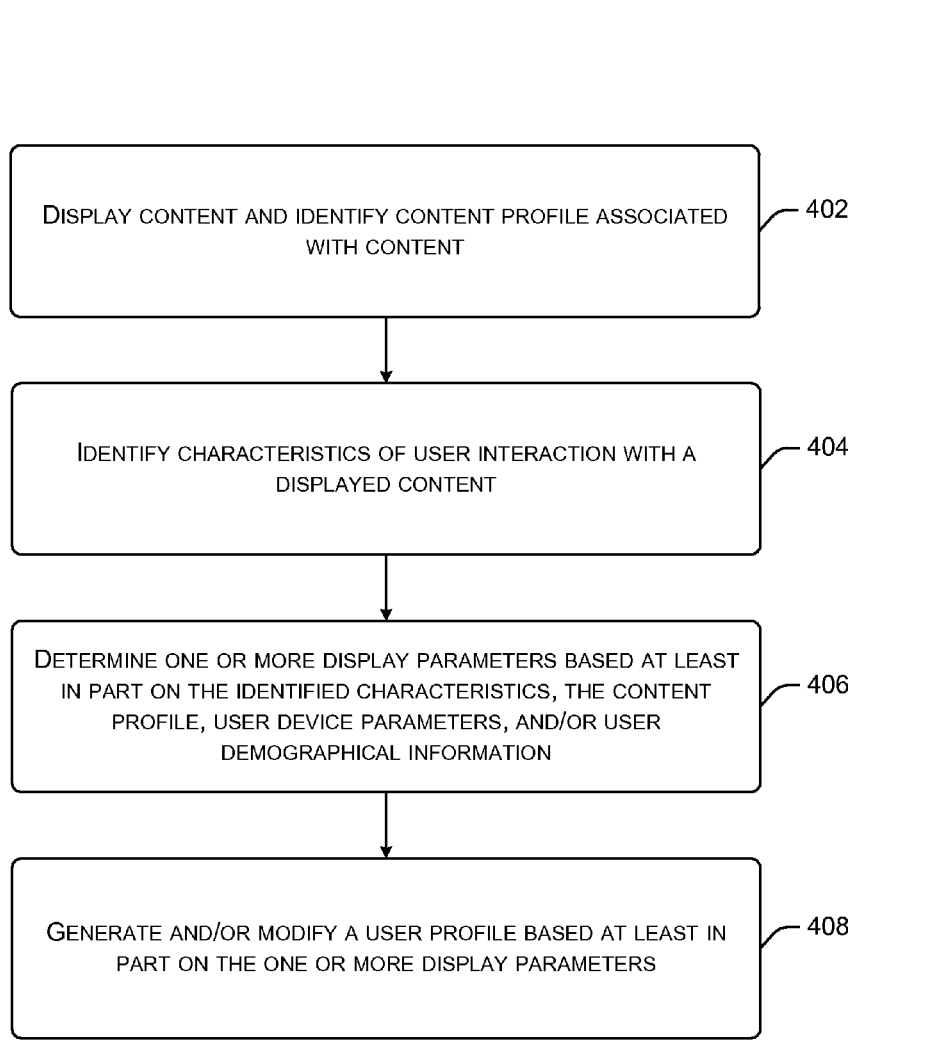
FIG. 4 is a flow diagram illustrating an example method for providing a user profile for providing a customized user interaction experience as illustrated in the example method depicted in FIG. 3, in accordance with embodiments of the disclosure.

Referring now to FIG. 4, an example method 400 for providing a user profile for providing customized user 120 interaction experiences is discussed. The method 400 may be performed by the user device 110 in conjunction with other entities of the architecture 100. In one aspect, the user profile generated by the method 400 may be used in method 300 of FIG. 3 to provide a customized user display and interaction experience. At block 402, content may be displayed and a content profile with the content may be identified. The content may be any suitable content, such as web pages, documents, spreadsheets, tables, charts, images, movies, and/or sounds. The content profile, as described above, may provide a variety of information related to the content. Such information may be related to regions on the content that may be interacted with by the users 120, such as on the touch sensitive display screen 130. Other examples of information about the content may include types of elements, such as images or text, in various locations of the displayed content. Further examples of information incorporated in the content profile may include subject matter associated with various locations of the content.

At block 404, one or more characteristics of the user interaction with displayed content may be identified. In one aspect, the processors 200 may identify the user's interaction area on the touch sensitive display screen 130. This interaction area may be related to the user's finger size and the force with which he/she touches the touch sensitive display screen 130. In another example, the processors 200 may determine the user's scroll speed and/or dwell time at different sections and/or locations of the content. The dwell time and/or scroll speed may be related to the user's interest in various subject matter that may be part of the content displayed on the touch sensitive display screen 130. In another example, the processors 200 may observe if the user scrolls through particular items quickly, such as images, in the displayed content. Further still, the processors 200 may identify the user's preferred scroll speeds based on how quickly the user tries to scroll through the content in general and how quickly the user may swipe on the touch sensitive display screen 130 to scroll. Further yet, the processors 200 may identify the accuracy, precision, and/or area with which the user touches an interaction location on the content as displayed on the touch sensitive display screen 130. In some cases, the accuracy, precision, and/or area of the touch may depend on the position of the interaction location on the touch sensitive display screen 130. For example, the accuracy, precision, and/or area may be different on the edges of the touch sensitive display screen 130 than in the middle of the touch sensitive display screen 130.

At block 406, based at least in part on the identified characteristics, the content profile, user device parameters, and/or user demographical information, one or more display parameters may be determined. In one aspect, the display parameters may be indicators of the user's preferences and style of interacting with displayed content, such as on the touch sensitive display screen 130. The characteristics observed by the processors 200 at process 404 may be memorialized as a collection of one or more display parameters. The user device parameters may be related to the type of user device 110 and the type of touch sensitive display screen. For example, user interactions observed on a smart phone may be different than user interactions on a tablet computing device and, therefore, the user interactions on these different devices may be considered differently to arrive at the one or more display parameters. In certain embodiments, the user profile may provide indications for a varied user interaction customization based at least in part on the type of user device 110 used by the user 120. The user demographical information may be a variety of suitable information related to the user 120. In certain embodiments, the demographical information may be voluntarily provided by the user 120 to the user device 110. In other embodiments, the user device 110 may ascertain the demographical information based on a variety of factors, such as the user's browsing history or purchase history.

The display parameters may further be collected together and at block 408, a user profile may be generated or modified based at least in part on the one or more display parameters. The user profile may be generated if no user profile exists for the user 120. Otherwise, an existing user profile associated with the user 120 may be updated with new display parameters that may have been determined using the currently displayed content on the touch sensitive display screen 130. In certain embodiments where display parameters associated with the user may have been determined multiple times, the display parameters to be included in the user profile may be determined in a variety of ways. For example, for numerical parameters, an average may be calculated from each data point associated with the numerical display parameter.

It should be noted that the method 400 may be modified in various ways in accordance with certain embodiments. For example, one or more operations of the method 400 may be eliminated or executed out of order in other embodiments. Additionally, other operations may be added to the method 400 in accordance with other embodiments.

Figure 5:
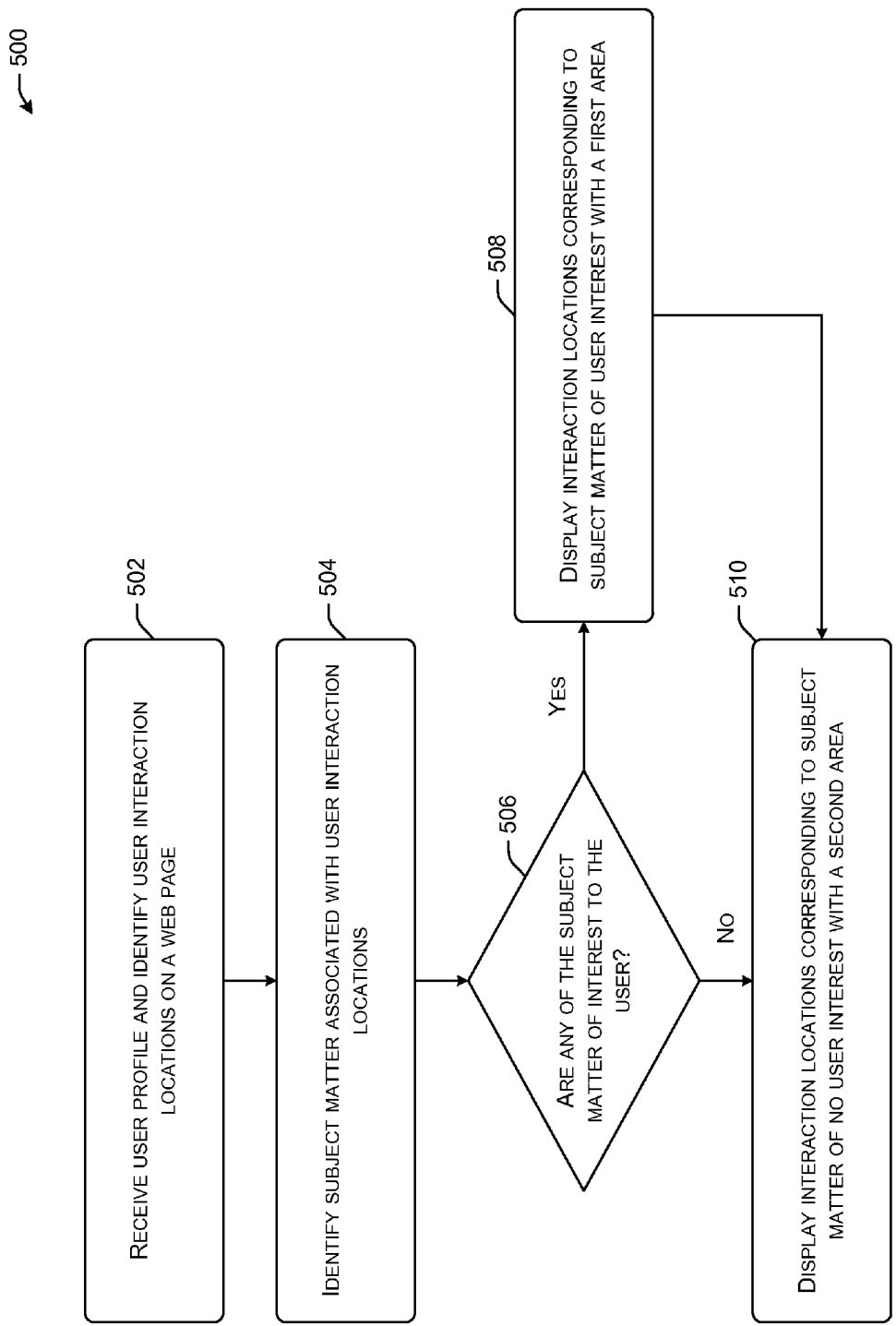
FIG. 5 is a flow diagram illustrating an example method to display user interaction locations based at least in part on a user profile, in accordance with embodiments of the disclosure.

Referring now to FIG. 5, an example method 500 to display user interaction locations based at least in part on a user profile is discussed. This method 500 may be performed by the user device 110 and the processors 200 thereon by running instructions stored on the memory 210 or received by the processors 200 from another entity. In one aspect, the method 500 may be an example implementation of method 400 for providing a customized display of a web page that may be served by the web servers 150. At block 502, user interaction locations on the web page may be identified and a user profile associated with the user may be received. These user interaction locations may be locations where the user may be able to interact with the content displayed on the touch sensitive display screen 130. In one aspect, the user 120 may be able to interact with a particular interaction location by touching that interaction location when it is displayed on the touch sensitive display screen 130. The interaction location may, as an example, be a button displayed on the touch sensitive display screen 130, that when touched, may effect an action such as playing of a video or playing of music. As another example, the interaction location may be text and/or images that may be hyperlinked. In other words, by touching the text and/or images associated with the interaction location, the touch sensitive display screen 130 may display a different section of the content or display a different content on the touch sensitive display screen 130. The user profile may indicate information related to the user's interests and subject matter within content that may be of relatively greater interest to him/her.

At block 504, subject matter associated with the interaction locations may be identified. The subject matter may be identified from the content profile associated with the content. This content profile may be generated based at least in part on one or more of metadata associated with the content and received by the user device 110 or based on analysis of the content, such as text recognition and/or OCR, by the processors 200. In certain embodiments, a subject matter associated with each of the interaction locations of the web page may be identified by the processors 200.

At block 506, it may be determined if any of the subject matter associated with the interaction locations may be of interest to the user. This may be assessed by comparing the subject matter of the interaction locations as determined from the content profile with the user's interest areas based at least in part on the user profile associated with the user. If it is determined that the web page does contain interaction locations associated with subject matter of interest to the user 120, then at block 508, the interaction locations corresponding to subject matter of interest to the user may be displayed with a first area. This first area may be a predetermined area or may be determined based on how many other interaction locations there may be on the web page or in relative proximity to the interaction location of interest. If at block 506, it is determined that there are no interaction locations that correspond with subject matter of interest to the user 120, then at block 510, the interaction locations that do not correspond to user interest may be displayed with a second area. In certain embodiments, the first area may be greater than the second area. In these and other embodiments, the first and second areas may further be based at least in part on the area, accuracy, and/or precision of the user's touch on the touch sensitive display screen 130 as identified by one or more display parameters of the user profile.

In effect, it will be appreciated that by executing the processes of method 500, the processors 200 may display the content on the touch sensitive display screen 130 of the user device 110 in a way that is customized for the user 120 of the user device 110. Interaction areas, such as buttons and/or hyperlinks may be displayed more prominently, such as with a larger size and/or area, if those interaction areas correspond to subjects and/or elements that are relatively likely to be of interest to the user 120 of the user device 110.

It should be noted that the method 500 may be modified in various ways in accordance with certain embodiments. For example, one or more operations of the method 500 may be eliminated or executed out of order in other embodiments. Additionally, other operations may be added to the method 500 in accordance with other embodiments.

Figure 6:
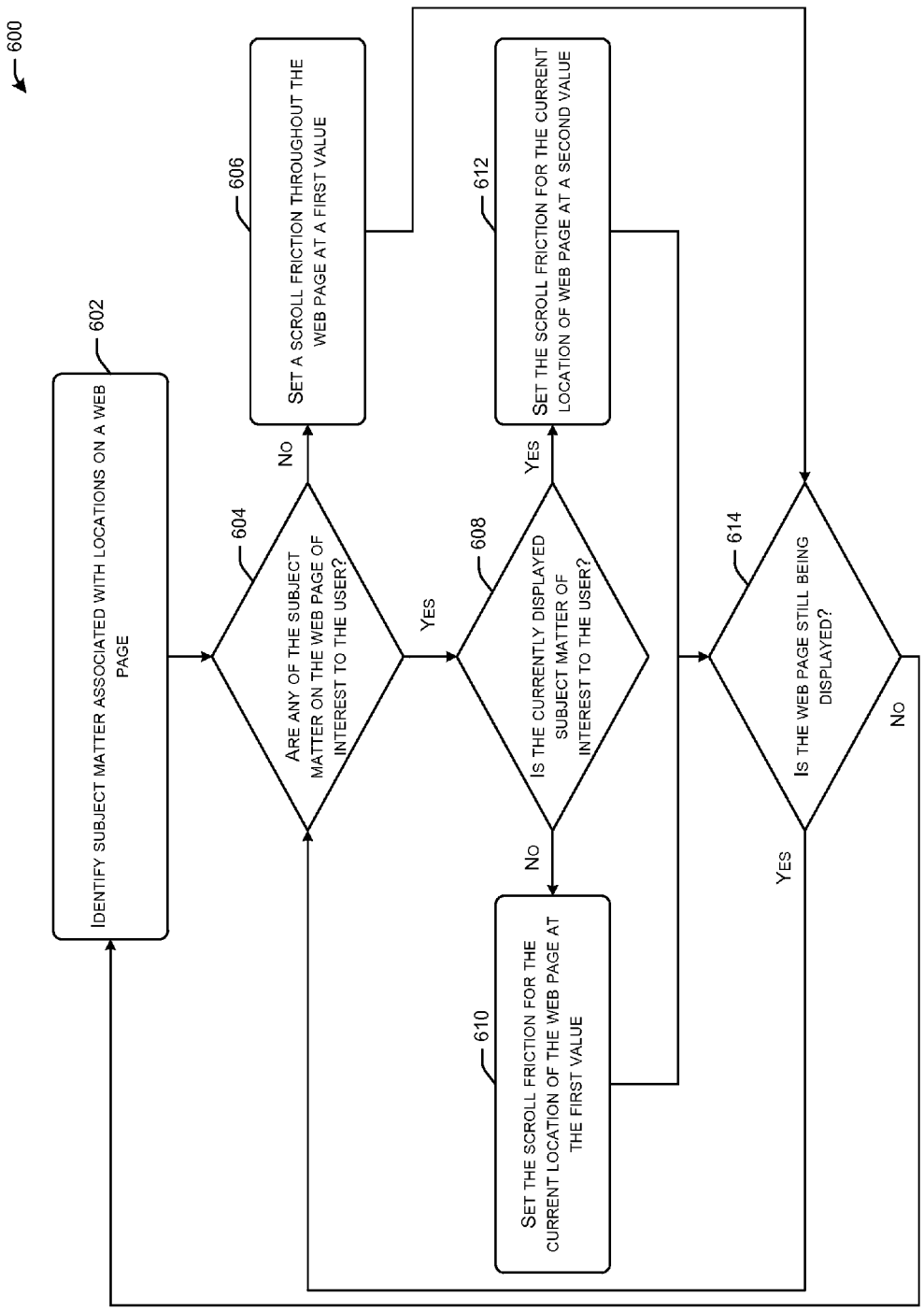
FIG. 6 is a flow diagram illustrating an example method for setting a scroll friction based at least in part on identifying content, in accordance with embodiments of the disclosure.

Referring now to FIG. 6, an example method for setting a scroll friction based at least part on identifying subject matter associated with content displayed on the touch sensitive display screen 130 is discussed. The method 600 may be performed by the user device 110 and the processors 200 thereon in conjunction with other entities of architecture 100. At block 602, subject matter associated with particular locations on a web page may be identified. As discussed above, the subject matter at various locations of the web page may be ascertained by utilizing a content profile associated with the web page and received by the user device 110. At block 604, it may be determined if any of the subject matter identified as part of the web page may be of interest to the user. This assessment may be performed by comparing the subject matter associated with the website as identified in block 602 with subject matter of interest to the user 120 as can be determined from the user profile associated with the user 120. If it is determined that subject matter of the web page is not of interest to the user 120, then at block 606, a scroll friction may be set at a first value throughout the displayed web page. If however, at block 604 it is determined that the at least one subject matter of the web page is of interest to the user, then at block 608, it may be determined if the currently displayed subject matter is of interest to the user.

If it is determined that the currently displayed subject matter is not of interest to the user, then at block 610, the current scroll friction may be set at the first value. If however, at block 608, it is determined that the currently displayed subject matter is of interest to the user, then at block 612, the scroll friction may be set at a second value. In certain embodiments, the second value may be relatively higher than the first value. In these cases, the web page may scroll more slowly when content likely to be of interest to the user is displayed on the touch sensitive display screen 130 for the same speed and/or frequency of finger swipes on the touch sensitive display screen 130. Once the scroll friction is set at the currently displayed portion of the web page, at block 614, it may be determined if the web page is still being displayed. If the web page is still being displayed, then the method 600 may return to block 608 to determine if the currently displayed subject matter is of interest to the user as an input to setting the current scroll friction. If at block 614 it is determined that the web page is no longer being displayed, then the method 600 may return to block 602 to act on the next web page displayed on the touch sensitive display screen 130.

It will be appreciated that in certain embodiments, the scroll speed and/or friction associated with a representation of the displayed content may be customized based at least in part on the user profile. In this case, the representation of the content may be any type of shrunken, condensed, and/or expanded representation of the displayed content. For example, a zoomed out version of the content shown in a side bar of the touch sensitive display screen 130 may be considered a representation of the content. In this case, display customization applied to the content display may further be provided for the representation of the content.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

Figure 7:
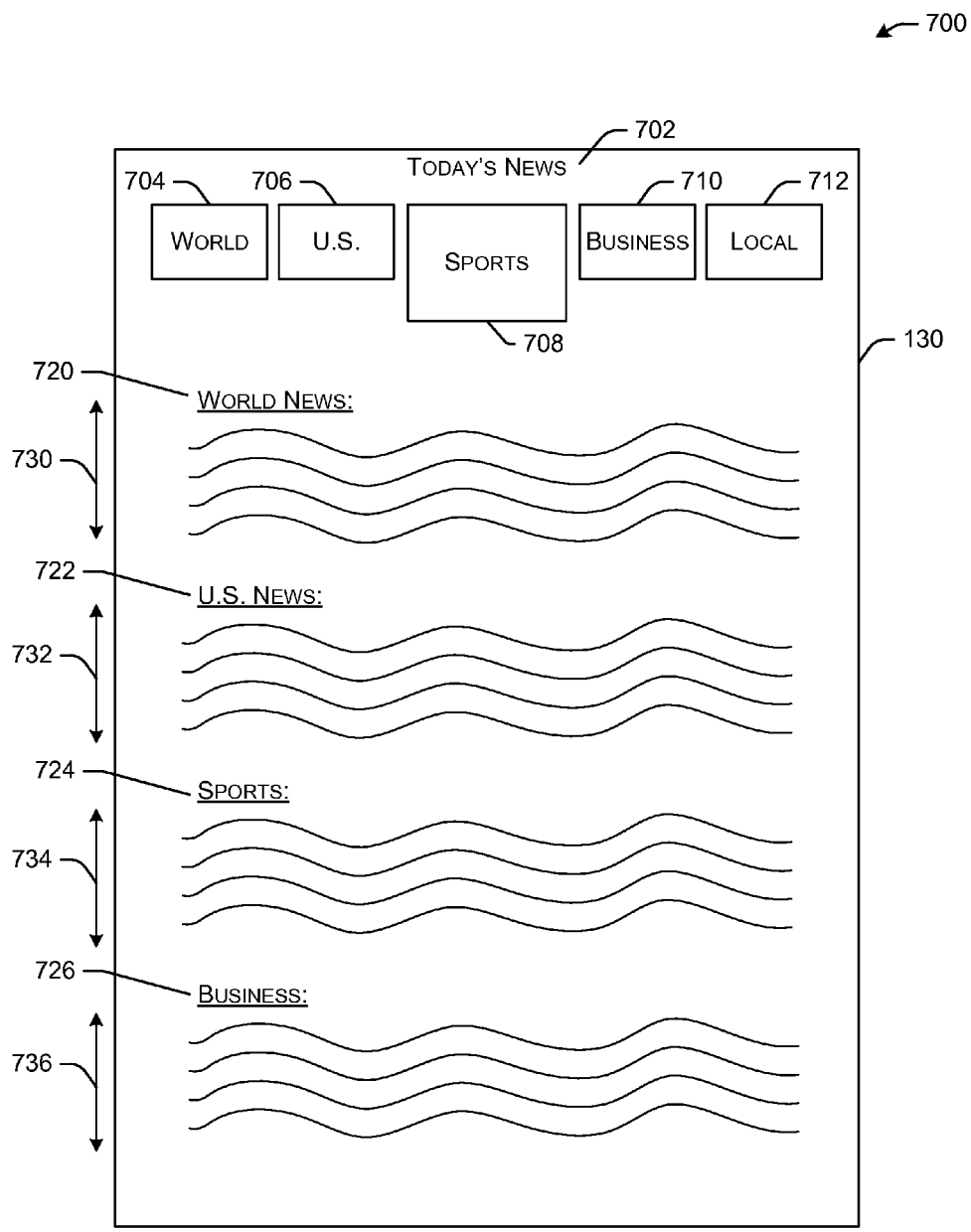
FIG. 7 is a schematic diagram illustrating an example user interface that has been customized based at least in part on a user interaction profile, in accordance with embodiments of the disclosure.

Referring now to FIG. 7, an example user interface that may be customized based at least in part on a user interaction profile associated with a user 120 is discussed. The user interface may be in the form of a web page 700 displayed on the touch sensitive display screen 130. While the web page 700 is shown as a news related web page, it will be appreciated that the web page may be associated with any suitable type of information, such as corporate web pages, financial web pages, commercial web pages, how-to guides, or the like. Furthermore, the discussion associated with web page 700 may generally apply to non-web page content, such as documents or the like.

The web page 700 may include a heading 702 and may include one or more user interaction locations 704, 706, 708, 710, 712. These interaction locations 704, 706, 708, 710, 712 may have subject matter, such as unique subject matter, associated with them. For example, in the context of news, the interaction locations 704, 706, 708, 710, 712 may correspond to world, U.S., sports, business, and local subject matters, respectively. These interaction locations when selected may move the display on the touch sensitive display screen 130 to particular locations on the web page 700. For example, touching the world interaction location 704 may move the displayed region of the web page 700 to the header 720 and/or section 730. Likewise, the other interaction locations 706, 708, 710, 712 may correspond to other headers 722, 724, 726 and/or sections 732, 734, 736 on the web page 700.

The user device 110 may display the website 700 in a customized manner by making more prominent the locations that may be of interest to the user 120 when displayed on the touch sensitive display screen 130. In this case, the processors 200 of the user device 110 may have ascertained that the user 120 of the user device 110 may be interested in sports. This assessment of the user interest may be made based at least in part on the user profile associated with the user 120. The processors 200 may have further ascertained that the web page 700 has elements related to sports, such as interaction element 708, header 724, and section 734. In this case, the display of the sports interaction location 708 may be relatively more prominent than other interaction locations 704, 706, 710, 712. While the relative prominence of the sports interaction location 708 is by a relatively greater area compared to the other interaction locations 704, 706, 710, 712, it will be appreciated that locations of interest on the web page 700 may be made prominent by a variety of suitable mechanisms, including, but not limited to highlighting, bolding, changing color, italicizing, shadowing, or the like.

Still referring to the web page 700 of FIG. 7, the user interaction with the web page 700 may further be customized. A customized interaction experience may be relatively more convenient, more intuitive, more rapid, and/or more productive than a non-customized interaction experience. As discussed above, it may be determined by the processors 200 of the user device 110 that the sports header 724 and the sports section 734 of the web page may be of interest to the user 700 based at least in part on the user profile and content profile. As a result, when the user 120 interacts with the web page 700, the scroll friction may be set at a relatively higher level of friction when the sports header 724 and sports section 734 is displayed on the touch sensitive display screen 130 compared to when other elements of the web page are displayed on the touch sensitive display screen 130. In other words, for similar length, frequency, and/or speed of swiping one's finger on the touch sensitive display screen 130, when the sports content 734 and header 724, or otherwise elements of interest to the user 120 are displayed on the touch sensitive display screen 130, the scroll speed may be relatively less than when elements of relatively less interest to the user 120 is shown on the touch sensitive display screen 130.

It will further be appreciated that the selection field, or otherwise the area that may be touched to select a particular interaction location 704, 706, 708, 710, 712 may be customized according to the received user profile. For example, an interaction location of interest to the user 120 may have a larger selection field associated therewith than an interaction location of relatively lower interest to the user 120. Therefore, those interaction locations of interest may be easier to select by the user 120 than interaction locations that may be of relatively less interest to the user 120. This customization of the selection field, with or without different level of emphasis of the interaction locations, may be particularly useful on relatively small sized touch sensitive display screens 130, where the interaction locations may be challenging to accurately and/or precisely touch by the user 120.

Figure 8:
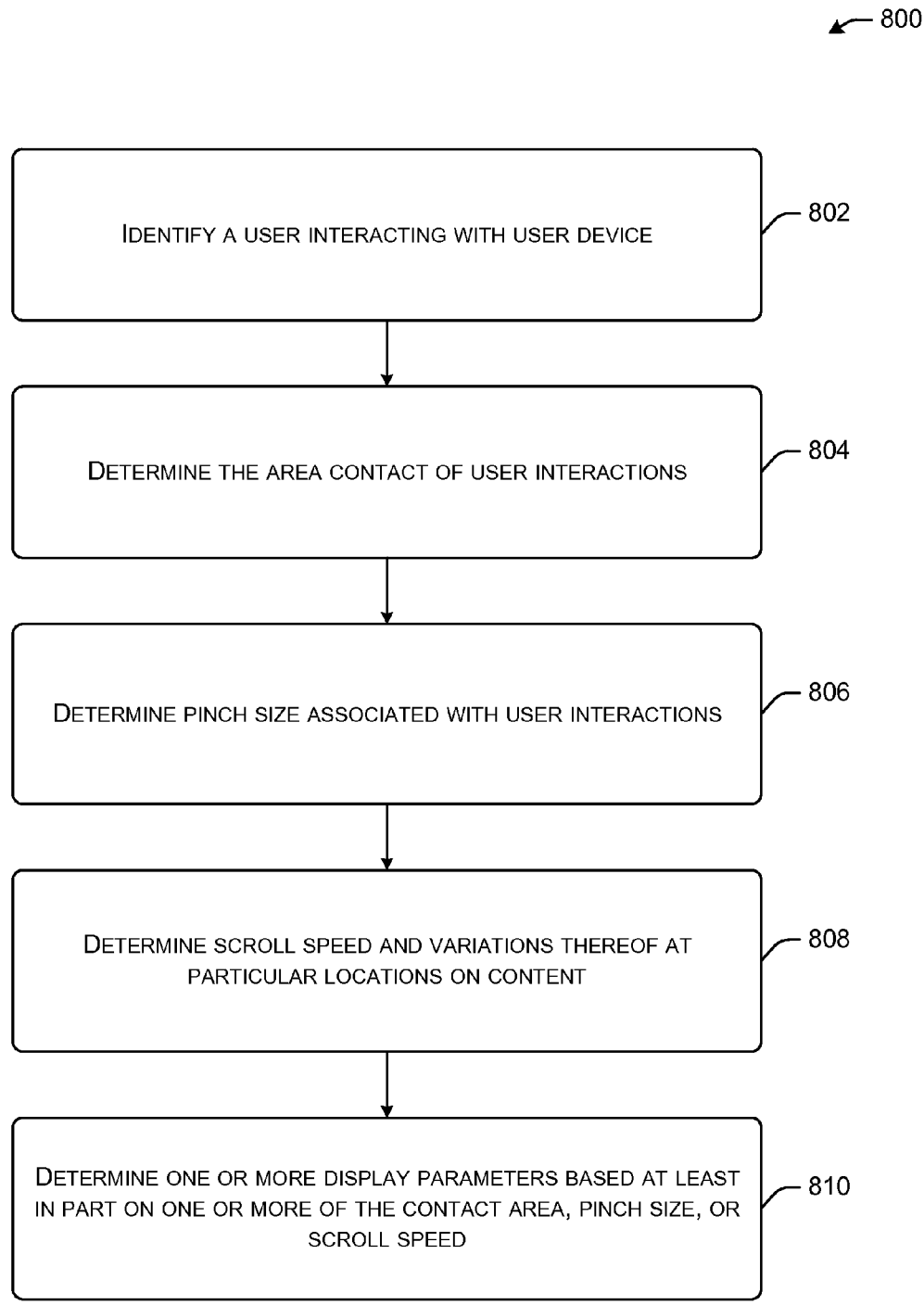
FIG. 8 is a flow diagram illustrating an example method for determining one or more display parameters based at least in part on various user interaction characteristics, in accordance with embodiments of the disclosure.

Referring now to FIG. 8, an example method 800 for determining one or more display parameters based at least in part on various user interaction characteristics is discussed. Method 800, as described herein, may be particular implementation of process 406 of FIG. 4. At block 802, a user interacting with the user device 110 may be identified. In one aspect, the user 120 may be identified based at least in part on information that may be solicited and/or provided by the user 120 to the user device 110 and the processors 200 thereon. The information provided to the user device 110 may include, for example, a login and password associated with the user 120 or a name or avatar associated with the user 120. In other embodiments, the user device 110 and the processors 200 thereon may determine the identity of the user 120 based at least in part on observations of the user's interaction with the user device 110. In these embodiments, the user device 110 may have a relatively limited number of user profiles stored thereon and certain markers of a particular user's interaction, such as the touch area size or pinch size on the touch sensitive display screen 130 may allow the processors 200 to relatively quickly and/or relatively accurately identify the identity of the user 120 currently using the user device 110.

At block 804, the area of contact of the user's interaction with the touch sensitive display screen 130 may be determined. As discussed above, in certain embodiments the area may be variable depending on the location of interaction on the touch sensitive screen 130. This may be a result of the mechanics of the human hand, fingers, and/or how the user 120 may hold and/or touch the user device 110 and the touch sensitive display screen 130 thereon. This process may also determine the precision and/or accuracy with which the user 120 may touch the touch sensitive display screen 130. At block 806, the pinch size associated with user interaction may be determined. The pinch size may be indicative of the user's hand size and may be a relatively good marker for customizing and/or calibrating the rate of content resizing on the touch sensitive display screen 130. At block 808, the scroll speed and the variations thereof at particular locations of the content may be determined.

At block 810, one or more display parameters may be determined based at least in part on one or more of the contact area, pinch size, and/or scroll speed. From the contact area, the processors 200 may be able to determine one or more display parameters associated with the sizing of user interaction locations. In some cases, relatively smaller interaction locations may be indicated in appropriate display parameters for users 120 that may have skinny and nimble fingers compared to users 120 that may have fat fingers. The pinch size, pinch velocity, and/or pinch direction reveral(s) may be used to define display parameters associated with resizing. These display parameters may be associated with possible user preferences of resizing speed and/or resizing limits (maximum size and/or minimum size). The scroll speed interactions may be evaluated in conjunction with the content profile of the content that may be displayed on the touch sensitive display screen 130. Locations where the user 120 scrolls relatively slowly may be considered locations of the content that correspond with subject matter that is of interest to the user. Therefore, the combination of the user's scroll behavior combined with information related to the subject matter at various locations of the content, as determined from the content profile, may be used to ascertain subjects of relative interest to the user 120. These subjects of interest may be memorialized as one or more display parameters that may be used to create and/or update the user profile.

It should be noted that the method 800 may be modified in various ways in accordance with certain embodiments. For example, one or more operations of the method 800 may be eliminated or executed out of order in other embodiments. Additionally, other operations may be added to the method 800 in accordance with other embodiments.

Figure 9:
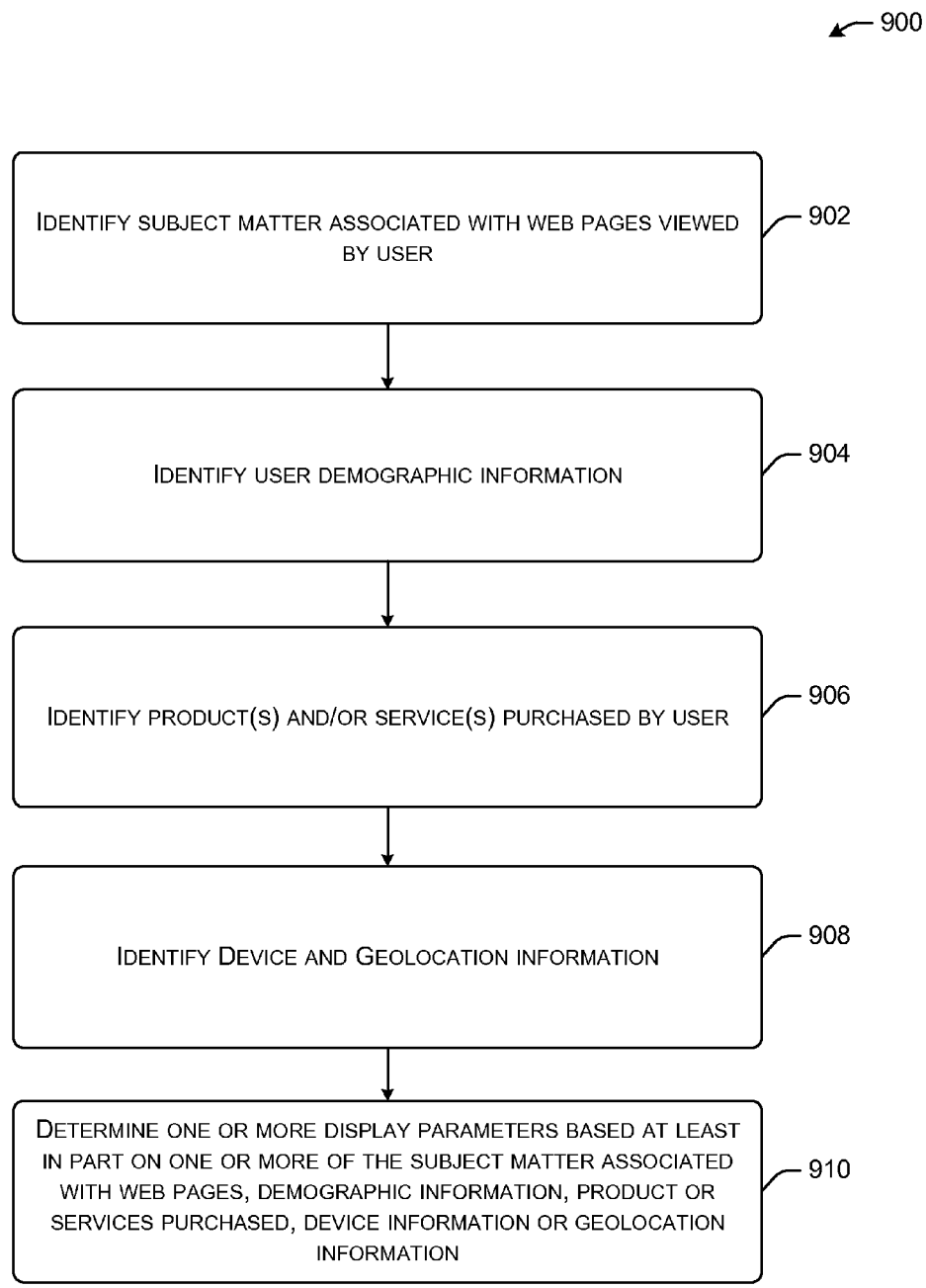
FIG. 9 is a flow diagram illustrating an example method for identifying one or more display parameters based at least in part on one or more identified user behaviors, in accordance with embodiments of the disclosure.

Referring now to FIG. 9, an example method 900 for identifying one or more display parameters based at least in part on one or more identified user behaviors is discussed. It will be appreciated that the user device 110 may use either and/or both of methods 800 as depicted in FIG. 8 or method 900 to generate one or more display parameters. This method 900 may be performed by the user device 110 and the processors 200 thereon. At block 902, subject matter associated web pages viewed by the user may be identified. In one aspect, the user device 110 and the processors 200 thereon may keep track of the user's web viewing history and may ascertain the subject matter of the web pages from a variety of sources, such as a table or from metadata associated with the viewed web pages. In certain cases, the user device 110 may access a web browser's browsing history to gather data associated with the user's browsing history and determine the user's browsing interests therefrom.

At block 904, user demographic information may be identified. The demographic information may include, but is not limited to, the user's income, family size, age, race, nationality, preferences, purchase habits, friends, tastes, or the like. In certain aspects, the demographic information may be solicited from and/or provided by the user 120. In other embodiments, the demographic information associated with the user 120 may be ascertained from the user's web browser history and/or purchase history. For example, if the user purchases a baby stroller, it may be likely that one or more of the user's family or friends may have a baby. In yet other embodiments, the demographic information may be received by the user device 110 from a third party and or other entity, such as a consumer information broker. At block 906, one or more products or services purchased by the user may be identified. The identification may be performed by the user device 110 from the web browser history or may be received from the user device 110 from any variety of sources, such as a retailer and/or online retailer.

At block 908, the user device type and the user's location may be identified. The user device type may be determined by the user device 110 from information that may be pre-established on the user device 110 prior to the user 120 acquiring the user device 110. Alternatively, the information related to user device type may be provided by the user 120 or may be received from a remote entity via networks 140 or other suitable communicative links. The location of the user 120 and the user device 110 may be ascertained by a variety of suitable mechanisms, including by user identification or based on an Internet address associated with the user device 110.

At block 910, one or more display parameters may be determined based at least in part on one or more of the subject matter associated with the web pages, demographic information, product or services purchased, user device information, and/or geolocation of the user. In one aspect, the user's interest may be determined based at least in part on each of the subject matter associated with the web pages, demographic information, and/or product or services purchased. For example, if it is determined that the user 120 visits a relatively high number of business and/or financial related web pages, the user may have an interest in business and/or finances. Further still, if the user's demographical information indicates children in the user's family, then it may be determined that the user 120 may be interested in children related topics. As yet another example, if the user's purchase history indicates a purchase of a relatively fancy sports car, it may indicate that the user 120 may have an interest in automotive topics. The user's user device type may also be used to determine the mechanism by which the user interacts with content displayed on the user device 110. Furthermore, the user's location may indicate the user's interests in certain cultural topics. The interest in a variety of subject areas may be indicated in the form of one or more display parameters.

Figure 10:
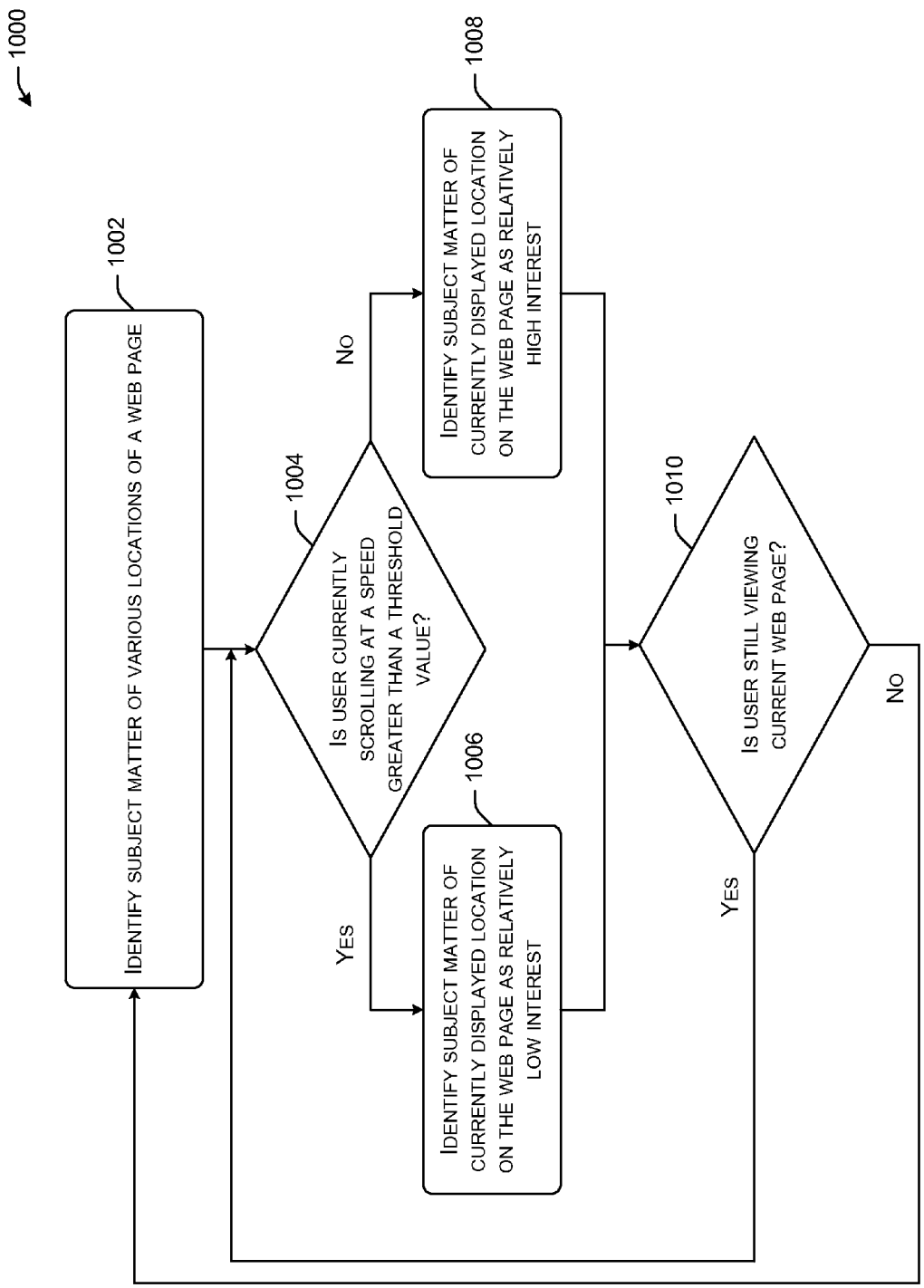
FIG. 10 is a flow diagram illustrating an example method for determining a user's interest in portions of a web page based at least in part on the user's scroll speed, in accordance with embodiments of the disclosure.

Referring now to FIG. 10, an example method 1000 for determining a user's interest in portions of a web page based at least in part on the user's scroll speed is discussed. This method 1000 may be performed by the user device 110 and the processors 200 thereon. At block 1002, subject matter at various locations of a web page may be identified. This may be performed by receiving a content profile associated with the web page. Alternatively, the subject matter may be determined by the processors 200 by a variety of mechanisms, such as natural language analysis and/or identifying key words and/or high frequency words within the various locations of the web page. At block 1004, it may be determined if the user is scrolling at a speed greater than a threshold value. If the user is scrolling faster than the threshold value, then at block 1006, the subject matter of the currently displayed location on the web page may be identified as relatively low interest to the user. However, if at block 1004 the user is scrolling slower than the threshold value, then at block 1008 the subject matter of the currently displayed location on the web page may be identified as relatively high interest to the user. Indeed, the level of interest of the user 120 may be determined by the speed at which the user 120 scrolls through various sections of the web page. If the user is scrolling slowly through a particular section, then that may indicate that the user 120 may be interested in the subject matter corresponding to that location of the web page. Likewise, if the user 120 is scrolling relatively quickly through a particular section of the web page, then that may indicate that the user may not be particularly interested in the content corresponding to the section through which he/she is quickly scrolling. At block 1010, it may be determined if the user is still viewing the web page. If the user is still viewing the page, then the method 1000 may return to block 1004 to continue assessing the interest level of the user in various sections of the web page. However, if the user is not still viewing the web page then the method 1000 may repeat with a new web page.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A system, comprising:
a touch sensitive display screen configured to display content and detect contact from a contacting element;
at least one memory that stores computer-executable instructions;
at least one processor that accesses the at least one memory, wherein the at least one processor that executes the computer-executable instructions to:
receive a user profile associated with a user;
receive the content and a corresponding respective content profile;
identify at least one location of user interest among one or more locations in the content based at least in part on the user profile and the content profile, wherein the one or more locations in the content are identified by monitoring a speed at which the user scrolls through portions of a previously displayed content on a user device;
identify at least one interaction element of interest among one or more interaction elements in the content based at least in part on the user profile and the content profile, wherein each of the one or more interaction elements are selectable by the user; and
display at least a portion of the content on the touch sensitive display screen,
wherein the at least one interaction element of interest is displayed more prominently than the other of the one or more interaction elements, wherein an indication of user selection of the at least one interaction element of interest results in a display of another portion of the content or a display of another content, and wherein a scroll friction is set at a first value when the displayed portion of the content includes one or more of the at least one location of user interest and the scroll friction is set at a second value when the displayed portion of the content does not include one or more of the at least one location of user interest.

2. The system of claim 1, wherein the content profile indicates at least one of: (i) one or more subject matter associated with the content; (ii) one or more subject matter associated with a particular location of the content; (iii) location of one or more interaction element; (iv) user device profile; or (v) one or more subject matter associated with a particular interaction element.

3. The system of claim 1, wherein to identify at least one location of user interest among one or more locations in the content comprises:
identify at least one subject matter of user interest based at least in part on the user profile;
identify at least one subject matter of the content based on the content profile; and compare the at least one subject matter of user interest and the at least one subject matter of the content.

4. The system of claim 1, wherein to display the at least one interaction element of interest more prominently than the other of the one or more interaction elements comprises displaying the at least one interaction element of interest with at least one of: (i) greater area of contact relative to the other of the one or more interaction elements; (ii) bolding relative to the other of the one or more interaction elements; (iii) different color relative to the other of the one or more interaction elements; (iv) italics relative to the other of the one or more interaction elements; (v) shadowing relative to the other of the one or more interaction elements; or (vi) providing a larger field of interaction relative to the other of the one or more interaction elements.

5. A method, comprising:
displaying, by a user device comprising one or more processors and a display screen, a content on the display screen;
identifying, by the user device, one or more information associated with the displayed content;
receiving, by the user device, an indication of user interaction by a user with the touch sensitive display screen;
generating, by the user device, a user profile based at least in part on the indication of user interaction and the one or more information associated with the displayed content;
displaying a second content on the touch sensitive display screen based at least in part on the user profile; and
identifying at least one location of user interest among one or more locations in the second content,
wherein the user profile indicates one or more predictions of content display preferences of the user, and wherein the user interaction comprise monitoring a speed at which the user scrolls through the displayed content, and wherein the user profile indicates one or more interaction elements to display prominently, wherein each of the one or more interaction elements are selectable by a user, and wherein an indication of user selection of the one or more one interaction elements results in a display of another portion of the content or a display of another content, wherein a scroll friction is set at a greater value when the displayed portion of the second content includes one or more of the at least one location of user interest than if other of the one or more locations is displayed.

6. The method of claim 5, wherein the content comprises at least one of: (i) a web page; (ii) a text document; (iii) a word processing document; (iv) a digital book; (v) a chart; (vi) a table; (vii) an image; (viii) audio; or (ix) a movie.

7. The method of claim 5, wherein the one or more information associated with the displayed content comprises at least one of: (i) one or more subject matter associated with the content; (ii) one or more subject matter associated with a particular location of the content; (iii) location of one or more interaction elements; (iv) one or more subject matter associated with a particular interaction element; (v) user device information; (vi) user geolocation information; or (vii) language.

8. The method of claim 5, wherein the receiving the indication of user interaction comprises receiving one or more characteristics of the user's interaction with the touch sensitive display screen displaying the content, wherein the one or more characteristics comprise at least one of: (i) user interaction behavior; (iii) user contact area on the touch sensitive display screen; (iv) user contact precision; (v) user contact accuracy; (vi) user pinch size; (v) user scroll speed; or (vi) user scroll speed variation.

9. The method of claim 5, wherein generating the user profile is further based at least in part on at least one of: (i) the one or more information associated with the content; (ii) user demographic information; (iii) user web browsing history; or (iv) user purchase history.

10. The method of claim 5, wherein the user profile is indicative of at least one of: (i) user interests; (ii) user touch area; (iii) user touch precision; (iv) user touch accuracy; (v) user scroll friction preference; (vi) user scroll speed preference; or (vii) user content scaling speed preference.

11. The method of claim 5, wherein generating the user profile further comprise:
receiving a pre-existing user profile, the pre-existing user profile comprising one or more parameters; and
updating at least one of the one or more parameters of the pre-existing user profile.

12. The method of claim 5, wherein the user profile is transmitted to a profile server.

13. The method of claim 5, wherein the user profile is accessible by a second user device from the profile server.

14. The method of claim 5, further comprising displaying a second content on the touch sensitive display screen based at least in part on the user profile.

15. The method of claim 14, further comprising identifying at least one location of user interest among one or more locations in the second content based at least in part on the user profile.

16. The method of claim 14, wherein a scroll friction is set at a greater value when the displayed portion of the second content includes one or more of the at least one location of user interest than if other of the one or more locations is displayed.

17. The method of claim 14, wherein identifying at least one location of user interest among one or more locations in the second content comprises:
identifying at least one subject matter of user interest based at least in part on the user profile;
identifying at least one subject matter of the second content based on a content profile associated with the second content; and
comparing the at least one subject matter of user interest and the at least one subject matter of the second content.

18. At least one non-transitory computer-readable medium comprising computer-executable instructions that, when executed by one or more processors, executes a method comprising:
receiving a user profile associated with a user;
receiving a content and a corresponding respective content profile;
identifying at least one location of user interest among one or more locations in the content based at least in part on the user profile and the content profile, wherein the at least one location of user interest in the content are identified by monitoring a speed at which the user scrolls through portions of a previously displayed content on a user device;
identifying at least one interaction element of interest among one or more interaction elements in the content based at least in part on the user profile and the content profile, wherein each of the one or more interaction elements are selectable by a user, and wherein an indication of user selection of the at least one interaction element of interest results in a display of another portion of the content or a display of another content; and
displaying at least a portion of the content on a touch sensitive display screen,
wherein at least one of the at least one interaction element of interest is displayed more prominently than the other of the one or more interaction elements, wherein a scroll friction is set at a first value when the displayed portion of the content includes one or more of the at least one location of user interest, and the scroll friction is set at a second value otherwise.

19. The computer-readable medium of claim 18, wherein the content profile indicates at least one of: (i) one or more subject matter associated with the content; (ii) one or more subject matter associated with a particular location of the content; (iii) location of one or more interaction elements; (iv) one or more subject matter associated with a particular interaction element; (v) user device information; (vi) user geolocation information; or (vii) language.

20. The computer-readable medium of claim 18, wherein identifying at least one location of user interest among one or more locations in the content comprises:
 identifying at least one subject matter of user interest based at least in part on the user profile;
 identifying at least one subject matter of the content based on the content profile; and
 comparing the at least one subject matter of user interest and the at least one subject matter of the content.

21. The computer-readable medium of claim 18, wherein the first value is greater than the second value.

22. The computer-readable medium of claim 18, wherein the user profile is indicative of at least one of: (i) user interests; (ii) user touch area; (iii) user touch precision; (iv) user touch accuracy; (v) user scroll friction preference; (vi) user scroll speed preference; or (vii) user content scaling speed preference.

23. The computer-readable medium of claim 18, wherein displaying the at least one interaction element of interest more prominently than the other of the one or more interaction elements comprises displaying the at least one interaction element of interest with at least one of: (i) greater area relative to the other of the one or more interaction elements; (ii) bolding relative to the other of the one or more interaction elements; (iii) different color relative to the other of the one or more interaction elements; (iv) italics relative to the other of the one or more interaction elements; (v) shadowing relative to the other of the one or more interaction elements; or (vi) providing a larger field of interaction relative to the other of the one or more interaction elements.

24. The computer-readable medium of claim 18, wherein the method further comprises displaying one or more of the at least one location of user interest among one or more locations in the content.

* * * * *